United States Patent
Weber et al.

[15] 3,662,779
[45] May 16, 1972

[54] BLEED TYPE FLUID PRESSURE CONTROL APPARATUS AND DIAPHRAGM UNIT THEREFOR

[72] Inventors: Urban A. Weber, Brookfield; George J. Janu, Milwaukee, both of Wis.

[73] Assignee: Johnson Service Company, Milwaukee, Wis.

[22] Filed: Jan. 13, 1971

[21] Appl. No.: 106,185

[52] U.S. Cl. .................................. 137/489, 137/510
[51] Int. Cl. .......................... F16k 17/06, F16k 31/12
[58] Field of Search ............................ 137/489, 510

[56] References Cited

UNITED STATES PATENTS

| | | | |
|---|---|---|---|
| 2,067,229 | 1/1937 | Birch | 137/510 X |
| 3,155,366 | 11/1964 | Rasmussen | 137/510 X |
| 3,263,660 | 8/1966 | Hyde | 137/510 X |

Primary Examiner—Henry T. Klinksiek
Attorney—Andrus, Sceales, Starke & Sawall and Arnold J. De Angelis

[57] ABSTRACT

A pneumatic diaphragm control includes a diaphragm unit overlying a nozzle with a chamber connected to a fluid supply and to a load. The diaphragm unit is biased toward the nozzle by a coil spring or a fluid pressure. The diaphragm unit includes a rubber diaphragm, a central nozzle seal portion and an outer clamp ring connected by a single intermediate convolute portion. A single piece flat spring includes a peripheral clamp ring connected to a center member by three integral arms which extend circumferentially and radially between the inner and outer portions. The bottom surface of the diaphragm's seal portion is bonded by a suitable adhesive to the corresponding center portion of the spring. In the spring loaded unit the diaphragm is formed with an integral back lug supporting a spring guide such that spring force is on the top of the lug. The thickness of the lug provides temperature compensation for the expansion and contraction of the control housing or body.

36 Claims, 10 Drawing Figures

Patented May 16, 1972
3,662,779
2 Sheets-Sheet 1
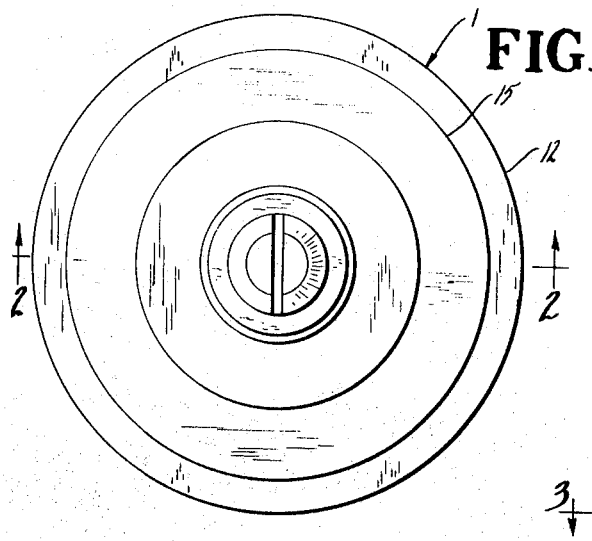
FIG.1
FIG.2
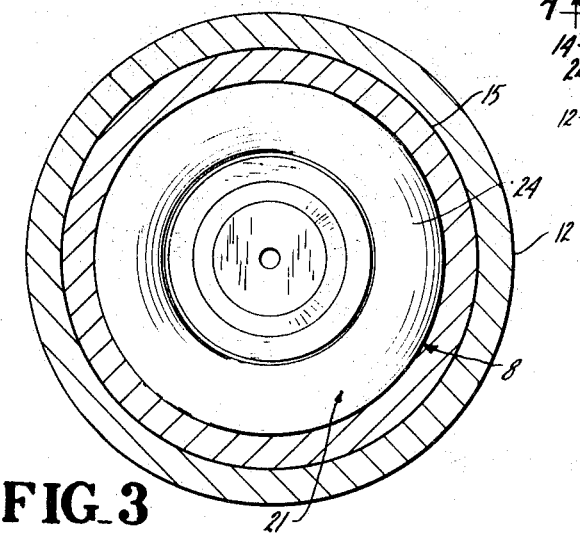
FIG.3
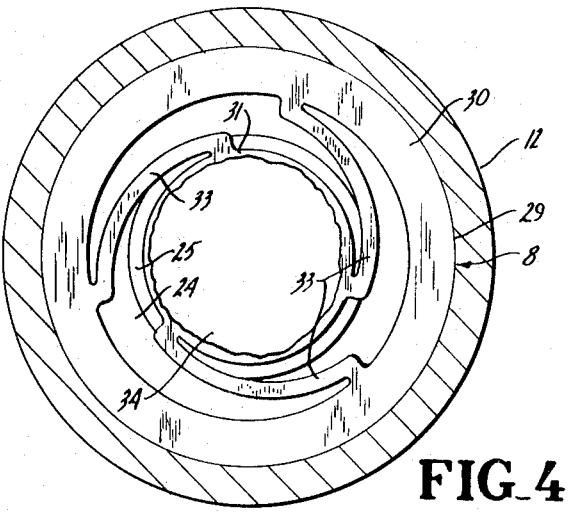
FIG.4
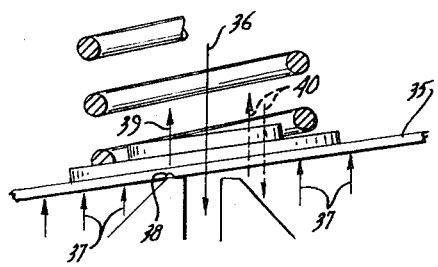
FIG.5
INVENTORS
URBAN A. WEBER
GEORGE J. JANU
BY
Attorneys Patented May 16, 1972
3,662,779
2 Sheets-Sheet 2
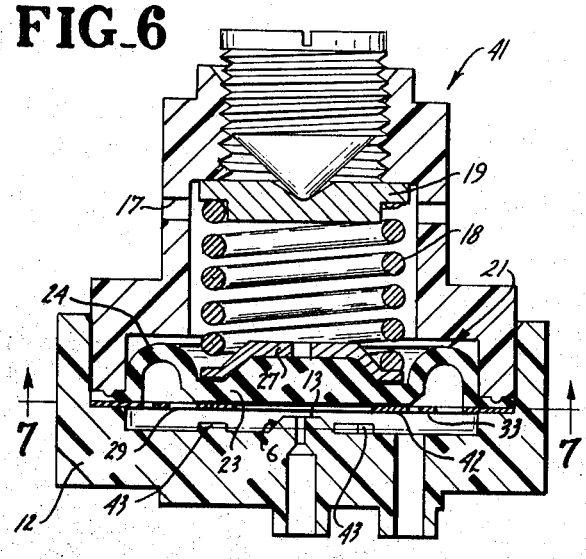
FIG_6
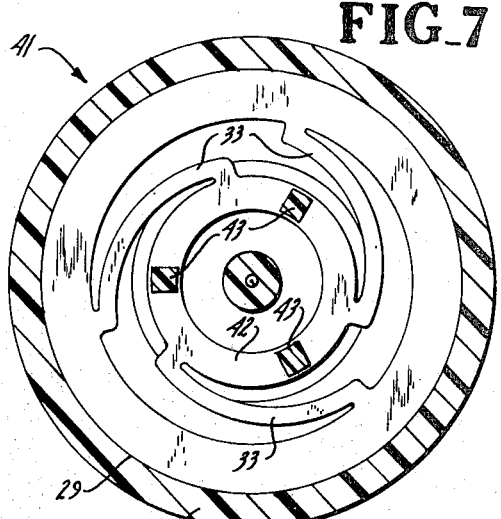
FIG_7
FIG_10
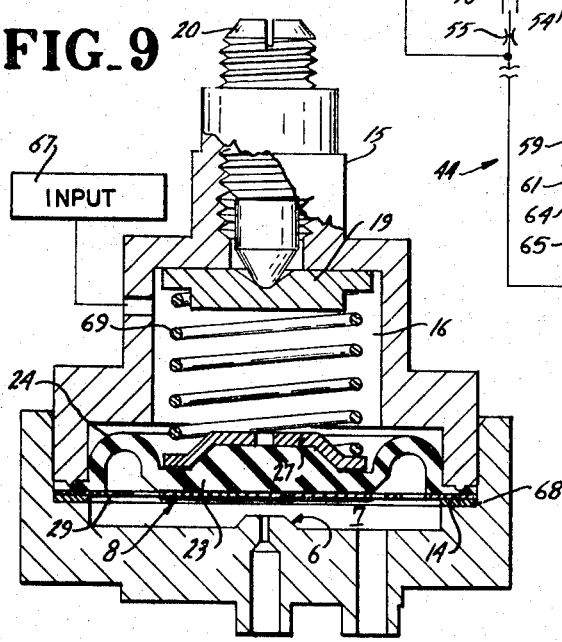
FIG_9
FIG_8
INVENTORS
URBAN A. WEBER
GEORGE J. JANU
BY
Attorneys

BLEED TYPE FLUID PRESSURE CONTROL APPARATUS AND DIAPHRAGM UNIT THEREFOR

BACKGROUND OF THE INVENTION

The present invention is directed to a bleed type fluid pressure control apparatus such as pressure regulators and pressure repeaters and particularly to a diaphragm unit therefor.

Fluid control systems and particularly pneumatic control systems often include pressure control means such as pressure regulators, pressure repeaters and the like to provide a particular characteristic and response within the system. A relatively well-known type of pressure control is a bleed-off type system or unit wherein a flexible diaphragm is secured within a housing in overlying relationship to a venting or bleed nozzle within an orifice or control chamber to variously bleed or vent the fluid supplied to the diaphragm chamber to a reference such as the atmosphere. The fluid is supplied to the chamber from a suitable supply through a pressure dropping supply restrictor. The diaphragm chamber pressure and the line between the chamber and the supply restrictor will assume a pressure related to the closure or spacing of the diaphragm unit from the nozzle. The diaphragm may be biased to a selected position by a suitable helical coil spring such as in the conventional control pressure regulator or by a signal pressure applied to the backside of the diaphragm such as in the conventional fluid diaphragm-type repeater. Thus, the diaphragm acts as a force balancing means between the force exerted by the spring or the signal input pressure and the output pressure established in the orifice chamber.

The diaphragm has the circumference rigidly fixed to and generally compressed between clamping portions of the regulator housing, for example, a body portion defining the diaphragm or output pressure chamber in an upper cap. The diaphragm is generally of the flat reinforced type which is moved to the working position in slightly spaced relation to the nozzle orifice means. It may have a convex or concave shape depending upon the position of the clamp with respect to the nozzle face and thus the force may be a negative or positive force depending upon whether it is required to be supplied by the spring or by the output pressure. This center displacement will not necessarily be a fixed value as the usual flat reinforced diaphragm has a "diaphragm rate" which is non-linear with distance, and, consequently, the force characteristic is non-linear. This, of course, will interfere with a truly linear response.

In such pressure controls, the diaphragm in the balanced position is minutely spaced from the face of the bleed nozzle. Generally, as a practical matter, a load spring will not be precisely and accurately centered and, consequently, the diaphragm will normally engage an edge of the bleed nozzle face due to the unbalanced spring load with a resulting tilting of the diaphragm across the orifice. Further, the diaphragm which is necessarily formed of a resilient material to permit sealing of the nozzle orifice will be compressed at the point of engagement of the tilted diaphragm. As a result, the force balance is not just the spring force opposed by the fluid pressure force within the chamber but further must include the spring force required to compress the diaphragm at the nozzle edge as well as the force necessary to bring the center of the diaphragm from the normal unloaded position to a working position.

Pressure regulators may include a variable means for adjusting the displacement or position of the adjusting spring. In this instance, the spring force will then be related to the positioning of the adjusting screw with respect to the orifice means and the compression rate of the coil spring. Although under controlled conditions the adjustment can be maintained constant, the regulator is generally subject to ambient temperature changes and the output pressure will deviate as the result of a change in the spring shear modulus inherent in the normal spring metal as well as the expansion of the regulator body. If the temperature, for example, increases, the spring constant which depends on the modulus G will decrease and the length of the regulator body and thus the position of the backing position for the spring will increase. As a result of both of these functions or occurrences, the compression of the spring decreases and the output pressure will decrease. Similarly, pressure regulators of this type will generally be load sensitive with the output pressure deviating with load flow. Any flow will require that the diaphragm move toward the bleed nozzle in order to further restrict the venting or bleed flow in order to establish and maintain the force balance on the diaphragm unit or the diaphragm. Such movement results in a decrease in the spring load and an increase in the sealing force. Both of these movements and/or force changes necessarily are accompanied by a decrease in the output pressure.

Experimentally, Applicants have found that the sealing force is of the more significant effect.

Further, the "diaphragm rate" of the conventional diaphragm may also contribute significantly to output pressure deviation with temperature changes and with load flow changes. Thus, in the conventional device, the output pressure regulator must be precisely constructed for close regulation and the temperature and load characteristics controlled in order to maintain a precise regulation.

Further, in regulators of the above type, when the regulator is cut off the spring will normally bias the diaphragm into sealing engagement with the bleed nozzle. In high output pressure applications this will normally result in adversely affecting the characteristic of the diaphragm. Where the bleed nozzle has relatively sharp edges it will tend to cut the diaphragm. Even if it does not physically disrupt the face of the diaphragm, the face is compressed and after any significant period of shut down the output pressure will shift during the initial restart time due to the relatively slow recovery of the indented portion of the diaphragm.

Generally, pressure regulators of the bleed type will be employed as a reference pressure source to operate at relatively low pressure levels and consequently there is minimal danger of diaphragm damage when the system is shut down. Such systems, however, usually require a very low output pressure deviation with temperature in load flow variations. Conversely, the pressure regulators may be employed as set point pressure adjustment regulators where a relatively wide range of adjustable output pressures are required with appropriate accuracy and linearity with the positioning of the adjusting screw dial or the like. This type of regulator is generally deadended and thus does not include load flow characteristics. However, because of the wide adjustable output pressure range required, such devices employ a spring which will tend to damage or adversely affect the diaphragm with the system shut down.

The sealing force characteristic associated with the pressure regulators is particularly undesirable in that it requires a relatively large waste air consumption. The diaphragm is in normal practice therefore held sufficiently far from the bleed nozzle face to limit the sealing force to some acceptable value under all normal or anticipated operating conditions. Alternatively, of course, the device can be precision formed to maintain the diaphragm unit essentially with the diaphragm face parallel to the nozzle face such that the sealing force is effectively removed. The working distance between the diaphragm and the bleed nozzle face is generally on the order of one ten thousandths of an inch in the usual type of practical regulator. To construct the compression spring and to produce an exactly balanced force about the diaphragm would require not only very careful construction of the compression spring but the associated spring guides, the adjusting screw interconnection and the like. As a practical matter such device would be too expensive for commercial practice or would be impossible to make with the required tolerances except on a very, very limited scale.

SUMMARY OF THE PRESENT INVENTION

The present invention is particularly directed to a highly improved fluid pressure control of the bleed type including a special novel diaphragm unit which can be employed to overcome the several problems and disadvantages encountered in the pressure control employing close spaced diaphragm units. The present invention particularly permits construction of such diaphragm pressure regulators with a highly stable output pressure with temperature and load flow variations. The diaphragm unit of this invention has a relatively high rigidity in the radial direction to minimize shock sensitivity of the pressure control. In the spring loaded constructions, the present invention maintains a high accuracy and a linearity for the output pressure adjusting screw or the like.

Generally, in accordance with the teaching of the present invention, the diaphragm unit includes a diaphragm of a resiliently compressible material having an outer edge clamp portion, a central seal portion and an intermediate convolute portion interconnecting the edge clamp portion and the central seal portion. A flat disc-like spring includes a peripheral clamp portion aligned with the corresponding edge of the diaphragm. The spring includes an inner portion which is firmly affixed to the seal portion and which is interconnected to the outer spring clamp portion by a plurality of spring arms. The flat spring and interconnected base are interconnected into the pressure control unit whether it is a regulator or a repeater with the outer edges immovably fixed to the housing generally by clamping of the clamp portion's edge in stacked relation between interconnecting housing portions. The convoluted diaphragm and spring are relatively soft and has a negligible spring rate in the axial direction with respect to the nozzle. Consequently, the assembly has essentially a zero diaphragm rate with respect to the control movement and the movement to the working position does not appreciably enter into the force balance equation as previously discussed for the conventional flat reinforced diaphragm. However, when employed in a fluid repeater, the force required to move the diaphragm unit to the working position can be a constant which establishes the set point from which the repeater action is established.

Further, the interconnection of the central portion of the diaphragm to the corresponding portion of the spring in the structure of the present invention establishes a high stiffness in the radial direction. The diaphragm unit even with low working stiffness in the axial direction maintains a precise mounting similar to that of a flat reinforced diaphragm such that the diaphragm is accurately centered even though the spring load is off center. Further the regulator shock sensitivity related to any possible change in the diaphragm center position and against the bleed nozzle is minimized and/or eliminated. In a particularly novel construction of the present invention, the base is formed of any well-known diaphragm material such as silicone rubber or any other material which is generally oil resistant and preferably has a relatively high coefficient of linear expansion with temperature when compared with the material forming the regulator body. The spring is formed of a thin sheet of beryllium copper alloy or other suitable material and is formed, preferably, by an etching process to define an outer clamping portion and the inner seal portion interconnected by three integral arms which generally extend circumferentially and radially between the inner and outer portions. The bottom surface of the diaphragm's seal portion is bonded by a suitable adhesive to the corresponding portion of the spring to provide an intimate bond therebetween.

The diaphragm is formed with an integral enlargement or lug portion extending outwardly from the seal portion to substantially and significantly increase the significance of this portion of the assembly. A spring guide is conformed to the projecting lug and includes an outer annular ledge supporting the spring. The spring force is thus exerted only on the top surface of the lug and the central sealing portion. Further, the thickness of the lug is selected to provide automatic temperature compensation for the expansion and contraction of of the control housing or body within which the diaphragm unit is clamped. Thus, the temperature coefficient of the diaphragm material and the control body material is, of course, known. The coefficient times the thickness of the lug portion is selected to balance the corresponding body coefficient times the axial length of the body within which the housing member or the spring is housed plus a constant which reflects the change in the shear modulus of the spring with temperature. The constant is selected to also preferably compensate for the changes in the spring mounting and adjusting components such as the adjusting screws, spring guides and the like with temperature.

Where the control is applied as a pressure regulator for establishing a reference pressure which is normally at a relatively low level, the central or seal aligned portion of the spring is formed as a continuous backing disc member which is secured to the adjacent portion of the diaphragm through an interfacing adhesive. The underside or bottom surface of the flat spring is then coated with a thin layer of a suitable resilient material generally of the character of the diaphragm such as silicone rubber. This substantially minimizes the normal compression of the diaphragm which is caused by the unbalance of the spring load, and establishes a minimal output pressure deviation as the result of any possible changes in the sealing force. Further, the thin layer of sealing material will not be punctured or excessively indented when the regulator is cut off and the diaphragm is pressed against the bleed nozzle by the load spring or pressure adjusting spring.

When the diaphragm unit, however, is to be employed with set point pressure regulators and the like, the diaphragm unit should be protected from the excessive spring loads. In accordance with a novel and preferred construction of the present invention, the diaphragm unit for such a regulator has the central spring portion formed as an annular ring to expose the diaphragm interiorly of the ring to the bleed nozzle face. When the regulator is in operation the rubber face of the diaphragm works against the bleed nozzle face. The control chamber is provided with a plurality of stop pads aligned with portions of the reinforcing flat spring. When the supply pressure is cut off, the load compression spring forces the diaphragm against the bleed nozzle face. The stop pads, however, interengage the flat spring to minimize and take up the principal load of the coil spring such that the central sealing diaphragm rubber of the diaphragm face is only very slightly compressed.

As previously noted also, the present invention can be readily applied to a regulator or a repeater. Thus, a regulator employs a spring load whereas a repeater provides a pressure output signal corresponding to the input pressure applied to a backing or control chamber. Obviously, in the repeater case, temperature compensation is not employed. The invention when employed as a repeater maintains the desirable linear characteristics as a result of the low working stiffness of the diaphragm unit in the axial direction. The low stiffness also results in a relatively low hysteresis characteristic even for relatively small diaphragm units and thus permits relative miniaturization of the invention for fluid controls.

In accordance with a further aspect of the present invention, a two stage bleed type regulating control includes a pressure regulator as the first stage with the output interconnected as the control pressure signal to an output or second stage repeater. The regulator and the repeater advantageously produce optimum results when employing the convoluted diaphragm and flat spring combination. The output of the first stage is thus deadended in the repeater and there is essentially zero deviation in output pressure due to output flow. The output pressure is thus accurately controlled by the positioning of an adjusting screw or the like. In the repeater, the special diaphragm unit eventually eliminates the stiffness constant of the diaphragm unit. Further, it has been found that the pressure loaded diaphragm unit is maintained essentially parallel to the bleed nozzle face so that the sealing force is essentially negligible. From this it follows that the resulting output pressure deviation as a result of output or load flow is negligible even when large changes in output flow are established. Applicants have found that the two stage regulator substantially reduces the waste air consumption over the more conventional single stage pressure regulator and that when the special convoluted diaphragm unit is employed the waste air consumption is reduced in the order of a factor of 10. Thus in this usual single stage assembly or unit the diaphragm must be maintained in spaced relation to the bleed nozzle face in order to limit the sealing force to some acceptable level.

Thus, in the broadest aspect of the two stage pressure regulator any diaphragm with relatively low stiffness in the axial direction can be employed. However, Applicants have found that the overall characteristics of the regulator in addition to the low output pressure deviation with the load are provided by the convoluted diaphragm units.

The present invention thus provides an improved fluid control of the bleed type having a movable diaphragm unit controlling or venting or exhausting of the main supply fluid and particularly a highly improved and stable diaphragm construction which minimizes variations in output pressure with temperature load and adjustment or the like of the control level. Further, the diaphragm unit of the present invention particularly adapts the unit to a miniaturized bleed type control.

BRIEF DESCRIPTION OF THE DRAWINGS

The drawings furnished herewith illustrate preferred constructions of the present invention in which the above advantages and features are clearly disclosed as well as others which will be readily understood from the following description of such embodiments.

In the drawings:

FIG. 1 is a top plan view of a pressure regulator constructed in accordance with the present invention;

FIG. 2 is a vertical section taken generally on line 2—2 of FIG. 1 and clearly illustrating the construction of the present invention;

FIG. 3 is a horizontal section taken generally on line 3—3 of FIG. 2 illustrating the construction of the diaphragm shown in FIG. 2;

FIG. 4 is a horizontal sectional view taken generally on line 4—4 of FIG. 2 and more clearly illustrating a flat spring construction shown in FIG. 2;

FIG. 5 is a diagrammatic simplified illustration of a conventional bleed type control for purposes of illustrating the force relationship involved in the balancing of a spring load;

FIG. 6 is a view similar to FIG. 2 illustrating an alternative construction of the present invention which is particularly adapted to a set point pressure regulator;

FIG. 7 is a horizontal sectional view taken generally on line 7—7 of FIG. 6 and more clearly illustrating the spring construction shown in FIG. 6;

FIG. 8 is a schematic illustration of a two stage pressure regulator constructed in accordance with a further aspect of the present invention;

FIG. 9 is a view similar to FIG. 2 illustrating a fluid repeater construction with an offset; and FIG. 10 is a graphical illustration of the unit of FIG. 9.

DESCRIPTION OF ILLUSTRATED EMBODIMENTS

Referring to the drawings and particularly to FIGS. 1 - 3, the present invention is shown in connection with a springloaded pressure regulator 1 connected to a main fluid supply 2 to supply a regulated pressure to a load 3. The pressure regulator 1 is connected to the supply connection in series with the restrictor 4 and selectively connects the upstream side of the restrictor to an exhaust 5 and by variably exhausting the connection controlling and maintaining a constant pressure to the load 3. The present invention is particularly directed to pneumatic controls which permit exhausting of the regulator to the atmosphere. It is therefore hereinafter described in connection with a pneumatic control. Generally, the pressure regulator 1 includes a nozzle and orifice unit 6 terminating within a pressure control or output chamber 7. A diaphragm unit 8 is mounted in relatively aligned relationship to the orifice 9 to adjust the venting of the chamber 7 to an exhaust port 10 and thus to the exhaust 5. A load port 11 in interconnected to the outside of the restrictor 4 and the input to the load 3. By variably spacing the diaphragm unit 8 with respect to the orifice 9 the pressure in the chamber 7 and port 11 and, therefore the load 3, is controlled to a constant value depending upon positioning of the spring loaded diaphragm unit 8 which particularly forms the subject matter of the present invention.

In the embodiment of the invention illustrated in FIGS. 1 - 3, inclusive, the regulator 1 includes a generally cup shaped round base 12. The exhaust port 10 is formed centrally of the base and terminates at the upper end in the nozzle and orifice unit 6. The load port 11 is also formed in the base and is laterally spaced of the exhaust port. The nozzle and orifice unit 6 is shown integrally formed in the bottom wall of the base 12 and projecting inwardly into the chamber 7. The inner end of the nozzle terminates in the relatively flat top face 13 and with the orifice 9 formed as a relatively small diameter opening providing communication between the chamber 7 and the exhaust port 10.

The orifice 9 is variably opened and closed by the spacing of the diaphragm unit 8 with respect to the flat top face 13 of the nozzle and orifice unit 6.

The base includes an outer annular ledge 14 with the peripheral portion of the diaphragm unit 8 resting on the ledge. An inverted cup shaped top housing 15 has a maximum diameter corresponding to the maximum diameter of the base 12 and telescopes into the base with the bottom peripheral portion aligned with the ledge and abutting the diaphragm unit 8 to clamp the diaphragm unit in position, and in particular to define an air tight joint about the diaphragm unit and thereby separating the chamber 7 from the surrounding atmosphere other than through the orifice 9 and exhaust port 10. Further, the housing 15 defines an upper spring chamber 16 which is suitably vented through vents to the atmosphere or to the exhaust through suitable vent openings 17. The housing 15 in the illustrated embodiment of the invention has a generally stepped cross section with a reduced portion defining the spring chamber 16 within which a helical coil compression spring 18 is disposed, with the lower end bearing on the diaphragm unit 8 and the upper end terminating in bearing engagement with an axially movable spring guide plate 19. An adjustment screw 20 is threaded in the upper end of the housing 15 and includes a pointed bearing end which bears on the center of the backside of the guide plate 19. Thus, the axial adjustment of the screw 20 positions the plate 19 inwardly toward unit 8 and thus forces the spring 18 inwardly towards the diaphragm unit 8 and thereby increases the load on the diaphragm unit 8.

The diaphragm unit 8 is forced toward the nozzle and orifice unit 6 and tends to approach the face 13, with the spacing therebetween controlling the exhausting of the supply air to the exhaust port 10 and thereby determining the pressure applied to the load.

The diaphragm unit 8 in accordance with the illustrated embodiment of the present invention includes a base diaphragm 21 formed of a suitable compressible resilient material. Generally, the diaphragm 21 may advantageously be formed of a silicone rubber or other suitable rubber material which is oil resistant and resilient. Further, the material of the diaphragm 21 is preferably formed of a material having a coefficient linear expansion with temperature which is relatively high in comparison to the expansion of the material of the housing 15 for reasons explained hereinafter.

The diaphragm 21 is especially formed with an outer clamping ring or peripheral portion 22 which rests on the clamping ledge 14 and is generally of a corresponding width. The diaphragm 21 includes a central seal portion 23 overlying the nozzle and orifice unit 6 and interconnected to the clamping portion by a convolute portion 24. In the illustrated embodiment of the invention, the clamping portion 22 and the seal portion 23 are shown joined by a single continuous convolution having a generally semi-circular cross section with the opposite edges integrally formed with the clamping portion 22 and the seal portion 23, such that the lower faces of the seal portion and the clamping portion are co-planar. The several portions 22 - 24 are integrally formed with the common corner between seal portion 23 and convolute portion 24 removed to define an inclined under edge 25 to produce a relatively flexible interconnection therebetween. The diaphragm 21 is further formed with an integral lug 26 extending outwardly from the backside of the seal portion 23. The integral lug 26 is shown having a generally frusto conical cross secton with the slightly tapered sidewalls terminating in an upper planar top wall. The integral lug 26 defines a support for a correspondingly shaped dished spring guide 27. The spring guide 27 includes an annular radially projecting lip 28 aligned with the lowermost convolution of spring 18 resting on the lip 28. The depth of the spring guide 27 is slightly less than the depth of the lug 26 such that the spring guide rests essentially upon the upper surface of the lug 26 and the spring force is transmitted to the diaphragm unit through the upper surface of the lug. The compression spring 18 thus can force the aligned portion of the diaphragm unit 8 downwardly toward the nozzle and orifice unit 6 and particular face 13 with the pressure in the chamber 7 opposing the spring force and locating the diaphragm unit 8 in accordance with the pressure balance therebetween. The convolute portion 24 establishes a relatively minimal axial stiffness and thus permits accurate positioning of the diaphragm in the axial direction.

However, the convolute diaphragm 21 in the radial direction is provided with a special flat spring 29 in accordance with the present invention, to establish high radial rigidity without interfering with the axial softness of the diaphragm. In the illustrated embodiment of the invention, the flat spring 29, as most clearly shown in FIG. 4, includes an outer peripheral portion 22 of the diaphragm 21 and is correspondingly clamped between the diaphragm and the ledge 14, which correspondingly supports the outer peripheral portion of the spring 29 in a rigid and movable support. A central seal disc portion 31 of the spring 29 is secured or bonded to the seal portion 23 of the diaphragm. Although the portion 31 may be secured in any suitable manner it is preferably intimately bonded to the underside of the diaphragm by a suitable adhesive 32.

The seal portion 31 is interconnected by the three spring arms 33 to the outer peripheral spring portion 30. Each of the arms, as most clearly shown in FIG. 4, is similarly constructed to extend radially and circumferentially of the diaphragm unit with the opposite ends of the arms integrally formed to the corresponding portions of the spring.

Although the spring 29 can be formed of any suitable resilient metal or the like or any suitable resilient generally incompressible material it is preferably formed by etching of the member from a thin sheet of beryllium copper alloy. The significant feature of the spring is that it be formed of a material which will maintain radial rigidity while permitting shaping and designing to have a negligible spring rate in the axial or vertical direction as viewed in FIG. 2. This is important to establish the desired characteristic for the total diaphragm unit 6 which is found to be present in flat reinforced diaphragms while eliminating the usual "diaphragm rate" in the axial direction.

In the embodiment of the invention illustrated in FIG. 1 - 4 the underside or bottom surface of the seal portion 31 of the spring 29 is provided with a thin sealing surface 34. Thus, the sealing surface 34 can be formed from a thin layer of a suitable resilient material similar to that of diaphragm 21 in particular a silicone rubber or other corresponding functioning material.

In the operation of the pressure regulator shown in FIGS. 1 - 4, the adjusting screw 20 is set to position the spring guide plate 19 within the spring chamber 16 and thus provide the reference position for the outer end of the compression coil spring 18. Associated dial and scale gradations, not shown, are proportional to the desired adjusting force and related to a particular output pressure in the chamber 7 and provided to the load 3. When the main supply 2 is connected to the regulator 1 and load 3, air is supplied to chamber 7 which opposes the action of the spring 18, compressing the spring against the plate 19. The pressure in chamber 7 rises and forces the diaphragm unit 8 axially outwardly until the opening to the orifice 9 provides an exhausting flow such that the pressure drop reduces the supply pressure to the spring load. The diaphragm unit 8 is then in a force balance position to maintain a preselected constant load pressure.

Various force factors which must be considered in connection with the bleed type unit are diagrammatically shown in FIG. 5 for a conventional flat reinforced diaphragm 35. The spring force is shown by a force arrow 36 which tends to move the diaphragm 35 downwardly over the illustrated orifice. The spring force is opposed by the pneumatic force in the chamber 7 which is illustrated by a plurality of pneumatic force arrows 37 which operate over the effective area of the diaphragm 35. In actual applications of pressure regulators particularly with high supply restrictors 4, the diaphragm in a balanced position is very closely spaced to the bleed nozzle face and generally in the order of one ten thousandths of an inch. The spring load will normally not be so accurately distributed circumferentially of the diaphragm as to maintain precise parallelism between the diaphragm and the nozzle face 13. As a result the diaphragm unit tilts slightly, as shown in FIG. 5, with a portion of the diaphragm 35 engaged by and compressed against the edge of the bleed nozzle face as at 38. This introduces a force factor and part of the spring force will be absorbed by the compressing of the diaphragm on the edge. Such a force is diagrammatically illustrated in FIG. 5 by the arrow 39. Further, in a flat reinforced diaphragm with the outer edge clamped at a given position with respect to the control nozzle and orifice unit an additional force is necessary to bring the diaphragm and particularly the central sealing portion to the working position close to the nozzle face. Thus the force may be either positive or negative depending upon whether the diaphragm in working position has a convex or a concave configuration with respect to the nozzle and orifice unit 6. The diaphragm deflection force is thus shown by a pair of oppositely directed arrows 40 to indicate that the force may be positive or negative. The force balance equation, considering all of these factors, may thus be written as follows:

$$P = (p \times A_{eff}) + S \pm Y$$

where, $P$ equals the force of the helical compression spring 18; $p$ equals the output pressure supplied to the load and thus the pressure appearing in chamber 7; $A_{eff}$ equals the effective area of the diaphragm over which the output pressure operates; $S$ equals the spring force necessary to compress the diaphragm on the nozzle edge; and $Y$ equals the force necessary to bring the center of the diaphragm to the working position adjacent the nozzle face.

A selected change in the output pressure may be obtained by displacement of the adjusting screw 20 with a corresponding change in the spring force. This requires a related change in the distance between the diaphragm and the bleed nozzle face to vary the effective restriction of the exhausting flow and the related pressure drop. The force equation can be rewritten in terms of the constants of the load spring and the diaphragm as follows:

$$k_s \times X = (p \times A_{eff}) + S \pm (k_d \times y)$$

where, $X$ equals the adjusting screw displacement with respect to the nozzle face; $k_s$ equals the compression spring rate for the coil spring; $k_d$ equals the "diaphragm rate;" and $y$ equals the diaphragm center displacement with respect to the nozzle face.

If the diaphragm rate, that is the stiffness or spring force of the diaphragm 35 in the axial direction, is not insignificant a non-linearity is introduced in the force $Y$.

Further, if the output of the pressure regulator, as shown in FIG. 5, is loaded with some output flow, the diaphragm 35 necessarily must move closer to the bleed nozzle face in order to further restrict the flow from the bleed nozzle in order to maintain the desired force balance on the diaphragm. This permits expansion of the spring and, consequently, a reduction in the spring load. This results in a further increase in the compression of the diaphragm with a resulting increase in the sealing force 38. Both these factors tend to decrease the output pressure and thus establish an output pressure deviation with load flow. Experiments with the conventional regulator have clearly indicated that the sealing force related to the compression of the diaphragm is generally much more significant than a variation associated with the slight change in the spring load.

The present invention, as illustrated in FIGS. 1 – 4, avoids significant variations in the characteristic. Thus, as previously noted, the diaphragm unit 8 of the present invention with the convoluted diaphragm 21 and the specially constructed flat spring 29 has a negligible stiffness in the axial direction and, consequently, has an essentially zero "diaphragm rate." As a result the force necessary to bring the center of the diaphragm to the working position is essentially eliminated from the force balance equation. Consequently, a relatively small outside diameter diaphragm assembly can be employed in the pressure regulator without danger of interfering with the range and linearity of adjustment through the variable compression of the spring. Thus, the diaphragm unit 8 may be formed with a relatively small outside diameter as compared with the more conventional flat reinforced diaphragm while maintaining comparable accuracy and linearity.

The relatively thin sealing layer 34 on the rigid spring seal portion 31 further substantially minimizes a change in the sealing force S which is introduced into the force balance equation with the change of output flow or load. Applicants have found that over the normal range of output flow employed with the regulator as shown in FIGS. 1 – 4 a very minimum output pressure deviation is obtained due to changes in the sealing force. Further, when applied as a reference pressure regulator which, as previously noted, is usually a relatively low pressure application, the thin sealing layer or coat 34 on the solid spring portion 31 prevents puncture or excessive indenting when the supply is shut off and the full spring force presses the diaphragm against the bleed nozzle face. As a result, the effective variation associated with the conventional sealing force which, as previously noted, is a high significant force characteristic in the conventional regulator has essentially been eliminated.

The bonding of the diaphragm 21 to the flat spring 29 creates and maintains the high stiffness in the radial direction and thus maintains insensitivity to shock forces and the like which is generally equivalent to that of the flat reinforced diaphragm and further a relative proper centering of the diaphragm unit 8 over the control nozzle unit 6 even when the load of the spring is somewhat off-center.

Further, as previously noted, the thickness of the diaphragm lug 26 which projects outwardly from the center seal portion 23 may be selected to provide for automatic compensation with temperature variations in accordance with the present invention. The total temperature equation may be written as follows:

$$k_{d-1} \times L \times \Delta T = k_t \times (B \times C) \times \Delta T$$

where $k_{d-1}$ equals the coefficient of temperature expansion for the material of the diaphragm in inches per inch °F;

$L$ is the total thickness of the diaphragm in the lug and seal portion;

$k_t$ is the coefficient of temperature expansion of the material for the housing top in corresponding units;

$\Delta T$ equals the change in ambient temperature in °F;

$B$ is the effective length of the housing from the face 13 of the nozzle orifice unit 6 to the upper fixed position of the adjusting screw; and $C$ is a constant in inches related to the change in the shear modulus of the spring with temperature as well as the expansion of the adjusting screw, the spring guides and the like with temperature.

The equation states that a change in ambient temperature T results in a change in the thickness of the lug portion of the diaphragm 21 which is equal and opposite to or therefore compensates for the change in the functional spring length caused by temperature related changes of the body and associated supports as well as for the change in the compression spring rate and the like with temperature such that the spring load on the diaphragm unit 8 is essentially constant with deviations in temperature. Consequently, there will be essentially no output deviation with temperature. Further, most of the satisfactory materials for the diaphragm 21 which can be employed will have a temperature coefficient of expansion which is a few times higher than any one of the usual regulator body materials and Applicants have found that compensation can be provided successfully to regulators even when constructed of relatively inexpensive plastic molded parts for the body, the caps, spring guide and the like. The use of plastic parts is highly desirable in connection with minimizing and reducing the cost of pressure regulators and the like.

The illustrated invention thus provides a highly improved reference pressure regulator and in particular provides a minimum variation in the output with relatively wide variation in the output flow.

The present invention is equally applicable, however, to pressure regulators which are employed for set point pressure adjustment. Generally, the latter type operate with relatively heavy spring loads such that with the pressure cut off there might be an excessive indenting or puncturing of the sealing face even with the construction illustrated in FIGS. 1 – 4. Generally, however, such regulators are employed with a load which is deadended so there is essentially zero variation in output flow. This application therefore does not have a requirement for establishing a minimum output pressure deviation with the flow. In this application, Applicants have found that the construction may advantageously be modified as more fully shown in FIGS. 6 and 7. Generally, the regulator 41 is constructed in the same manner as that shown with respect to the embodiment of FIGS. 1 – 4, and, consequently, corresponding elements are similarly numbered for simplicity and clarity of explanation. In the invention, as shown in FIGS. 6 and 7, the central portion of the spring 29 is especially constructed as a ring 42 bonded to the diaphragm seal portion 23 and integrally formed with the several arms 33. The internal diameter of the ring 42 is larger than the face 13 of nozzle and orifice unit 6 such that the bottom surface of the diaphragm portion 23 of diaphragm 21 is aligned with and constitutes the working surface spaced from the bleed nozzle face 13. The base 12 of the regulator, however, is provided with a plurality of limit stop pads 43 shown circumferentially spaced about the nozzle and orifice unit 6. The stop pads 43 are aligned with the spring and particularly the ring 42. The pads 43 terminate below the plane of nozzle face 13 such that the diaphragm unit 8 and particularly the ring 42 are spaced from the stop pads 43 under all working conditions. However, when the supply pressure is cut off, the compression spring 18 forces the diaphragm unit 8 downwardly with the seal portion 23 of diaphragm 21 sealing aginst the bleed nozzle face 13. However, the ring 42 of spring 29 contacts the stop pads 43 to limit the compression of the diaphragm 21 and to transmit a substantial portion of the spring load directly to the stop pads 43. Applicants have found that the modified construction provides all of the advantages of the first embodiment while permitting the wide range of adjustable output pressures with close spacement of the diaphragm face from the nozzle unit 6. The auxiliary stops prevent excessive interengagement of the diaphragm 21 with the nozzle unit 6.

Either of the above pressure regulators shown in FIGS. 1 and 6 can be readily adapted to and used as a pressure repeater by the replacement of the compression spring 18 with an input pressure load. The diaphragm acts in essentially the same manner as that previously described and includes all of the advantages previously described. This construction, however, as it is purely a pressure balance condition which is not affected by the variation in the elongation or contraction of the body does not require the automatic temperature compensation feature. The diaphragm however has the desirable minimal stiffness in the axial direction in order to maintain the highly desirable linear characteristics and low hysteresis while maintaining the very high rigidity in the radial direction. The construction of FIGS. 6 and 7 with the special diaphragm protection may be desirable whenever the supply pressure to the repeater is cut off without first removing the input signal to the pressure chamber.

The present invention thus provides a fluid pressure control unit of the bleed type having a highly advantageous diaphragm unit construction which not only permits reducing the size of the pressure regulator but minimizes the supply air consumption compared with the more conventional pressure regulator. Further, for corresponding size regulators the diaphragm of the present invention will improve the characteristics of the regulator particularly with respect to its sensitivity to shock, the minimizing of output pressure deviation with load and/or with the ambient temperature and the like.

In some special cases the temperature compensating feature of the diaphragm may be further modified in order to provide over or under compensation with temperature or to use the adjusted temperature deviation of the regulator itself to compensate for other changes in the overall operation of the system with temperature changes.

The temperature compensated feature of the diaphragm unit permits the use of materials for the regulator housing which have a relatively high coefficient temperature expansion such as plastic molded parts. Generally, for precision application brass, aluminum and the like have heretofore been employed in order to minimize the variation with temperature.

An example of a practically constructed regulator, as illustrated in FIGS. 2 and 6, is as follows. The flat spring 29 was formed of a beryllium copper alloy with a thickness of essentially 0.004–0.005 inches. The convoluted diaphragm was formed of a red silicone rubber of a 50° durometer hardness. The rubber had a linear coefficient of expansion of essentially $6 - 9 \times 10^{-5}$ inches per inch ° F. The regulator body was formed of aluminum, with a temperature coefficient of approximately $1.33 \times 10^{-5}$ or polysulfone, with a temperature coefficient of essentially $3 \times 10^{-5}$. The functional spring length was approximately one-half inch and the diaphragm lug and sealing portion was formed with a thickness of approximately 0.060 to 0.080 inches in order to provide a full temperature compensation for either one of the body structures discussed.

In the pressure regulator employed for adjusting a reference pressure such as shown in FIGS. 1 – 4, the surface of the center seal portion was coated with a self-leveling low viscosity silicone adhesive which, after curing, created a smooth and resilient sealing layer. A coating of a thickness approximately 0.004 to 0.008 inches gave high satisfactory results and particular minimum output pressure deviation with changes in load. The spring was formed of the usual spring steel such as stainless steel or "Nispan" alloy steel employed in pressure regulators. The reference pressure was generally within a range of 8 to 10 psi. The set point regulator was employed with an output pressure in the range of 2 to 17 psi.

Thus, the present invention provides a highly improved pressure regulator which eliminates the requirements of high precision part construction in order to produce a load temperature and shock insensitivity to the regulator. The construction of the regulator is particularly adapted to and provides a highly unusual control with a minimum amount of air consumption when employed in the novel circuit or pressure regulating system shown in FIG. 8.

Referring particularly to FIG. 8, the present invention is shown applied to forming a part of a novel two stage bleed type pressure regulator 44 connected between a supply 45 and a plurality of loads 46 and 47 of the type which require a relatively large range of flow change. Generally, in accordance with this aspect of the invention a first stage pressure regulator 48 has its input connected to supply 45 and its output connected to drive a pair of pressure repeaters 49 and 50. The single pressure regulator 48 may be connected to drive any number of repeaters. The regulator and repeaters are diagrammatically illustrated and are preferably constructed in accordance with the constructions shown in FIGS. 1 – 6.

More particularly, the regulator 48 is constructed in accordance with this teaching or the structure shown in FIG. 2 and includes a convoluted diaphragm spring unit 51 clamped within a housing 52 with an adjustable pressure setting helical bias spring 53 urging the diaphragm unit 51 toward a nozzle and orifice means 54. An input restrictor 55 connects the supply 45 to the control chamber 56 of regulator 51. In the embodiment illustrated in FIG. 8, a separate output port 57 interconnects the control chamber 56 to the repeaters 49 and 50. The pressure regulator 51 operates in essentially the same manner as heretofore discussed with respect to FIG. 2. The axial stiffness of the diaphragm unit 51 is minimal and the sealing force associated with the compression of the diaphragm of unit 51 on the edge of the nozzle and orifice unit 54 is substantially reduced. To completely eliminate the sealing force in diaphragm units which operate with a working gap of 0.0001 inches and the like would require exact squaring and uniform distribution of the compression spring force. This, in turn, would require precision construction not only of the compression spring but of the related spring guide, the adjusting screw and its engaging bearing point and the like. Such precision is not practical in normal commercial production. Further, the helical compression spring characteristic might create an output pressure deviation with load.

These factors are essentially eliminated in accordance with the teaching of the invention as shown in FIG. 8 by connecting the pressure regulator 48 to the loads 46 and 47 through the repeaters 49 and 50.

The repeaters 49 and 50 are similarly constructed and connected to the regulator 48 and respective loads 46 and 47 and the repeater 49 is described in detail.

Repeater 49 is also constructed with a special convoluted diaphragm unit 58 clamped within a housing 59 and defining a reference input chamber 60 to one side thereof and an output or pressure control chamber 61 to the opposite side thereof. A nozzle and orifice means 62 is centrally located within chamber 61 and aligned with the diaphragm unit 58. An input port 63 to chamber 60 is connected directly to the regulator output port 57. A main air supply port 64 is connected to the common supply through a high resistance restrictor 65. An output or load port 66 is connected to the output pressure chamber 57 and to the variable load 46.

The reference or input chamber 60 of the repeater 49 presents a deadended load to the output of the pressure regulator 58. As a result there is essentially no change in the load flow of the pressure regulator 48 and the usual output pressure deviation associated with the conventional pressure regulator is eliminated.

The diaphragm unit 58 of the repeater 49 maintains the force balance between the constant input pressure derived from the regulator 48 and the output pressure supplied to the load by controlling the position of the diaphragm unit 58 and thus the restriction to the nozzle and orifice means 62. The repeater 49 operates and essentially is described by the same basic equations as applied to the pressure regulator with the compression spring load being replaced by the input pressure load, which is the output pressure of the regulator 48 acting over the effective area of the diaphragm 48. This input load can be considered independent of the position of the diaphragm unit 58. The axial stiffness factor of the diaphragm unit 58 is for all practical purposes negligible. Further, Applicants have found that the sealing force within the repeater is essentially zero and once again, for practical purposes, can be neglected from the analysis in the design of a two stage pressure regulator.

As a result of all of the above, a two stage regulator, such as shown in FIG. 8, produces an essentially insignificant output pressure deviation with changes in the output load flow even when comparatively large changes in the output flow are desired or required. Further, the total air vented to the atmosphere or waste air consumption can be reduced by a factor of 10 while maintaining the negligible output pressure deviation with load.

In accordance with the broadest aspect of the invention as shown in FIG. 8, any type of diaphragm construction with a relatively low axial stiffness will produce a significant reduction in the waste air consumption. The special convoluted diaphragm unit, however, is required to maintain the low output pressure deviation with load and to provide minimum waste air consumption. Thus, with the construction of FIG. 8, the diaphragm units of both the regulator and repeater can operate very close to the face of the bleed nozzle unit to minimize the restricting of the bleed flow. Although the sealing force in the first stage may be increased, this is an acceptable condition because the output of the first stage is deadended and does not therefore encounter any output pressure deviation with the changes in load. In the repeater, the elimination of the spring essentially minimizes and, in fact, for practical purposes eliminates the spring sealing force effect, with the result that the diaphragm unit automatically assumes a position essentially parallel to the bleed nozzle face. It can, therefore, work extremely close to the bleed nozzle face without creation of a significant or effective sealing force.

As previously noted the single pressure regulator 48 can drive a number of repeaters such as where a single control pressure is to be maintained for several separate loads and the distance between the individual loads is comparatively large. The repeaters can be placed immediately adjacent the loads and the pressure drops normally associated with long connection lines would be eliminated. The construction of FIG. 8 is also particularly applicable to loads in which very large changes in output flow are required and would be provided by parallel connecting of the several outputs of the repeaters to a common load. The maximum output flow is for any one repeater, of course, limited by the size of the bleed nozzle unit as in order to establish a zero load flow all of the flow must be exhausted by the bleed nozzle unit, with the pressure drop of the bleed nozzle orifice being less than the adjusted output pressure.

A two stage pressure regulating system as shown in FIG. 7 was constructed in which the pressure regulator 48 included the novel convoluted diaphragm unit with an outside diamerter of 0.775 inches overlying a bleed nozzle orifice or bleed nozzle of 0.02 inches. The waste air consumption of the regulator was approximately 3 to 5 S.C.I.M. while maintaining satisfactory output pressure control. The repeater 49 was similarly constructed and adjusted to provide for the maximum anticipated output flow plus 3 to 5 S.C.I.M. waste air consumption flow. Thus, with the maximum output flow, the total bleed flow would be the summation of the two waste air consumption flows or equal to 6 to 10 S.C.I.M. A change in output flow was established zero and a maximum of approximately 200 S.C.I.M. With this construction the output pressure deviation was less than ± 0.025 psi.

This was compared with a single stage pressure regulator using the same type of a novel convoluted diaphragm unit. In such a construction it was found that the air consumption had to be adjusted to approximately 30 to 40 S.C.I.M. in order to obtain the output pressure deviation with load of not more than ± 0.1 psi per ± 15 S.C.I.M. of flow change. Thus the two stage pressure regulator provides a drammatic conservation in waste air consumption and provides a highly improved operating characteristic.

The repeater unit of the present invention can be constructed with a preselected offset, as shown in FIGS. 9 and 10. Generally, the repeater of FIG. 9 is constructed to correspond to the construction of FIG. 2 and corresponding elements in the two views are similarly numbered for the purposes of simplicity and clarity of explanation.

In the repeater construction of FIG. 9, the bias or input chamber 16 is connected to an input fluid signal 67 rather than to a reference pressure and thus provides an input bias signal similar to the connection shown diagrammatically in FIG. 8. Further, the diaphragm unit 8 of FIG. 9 is supported within the housing 12 with a spacer member 68 disposed between the ledge 14 and the diaphragm unit 8 to locate the central seal portion 23 in a substantial spaced relation to the nozzle and orifice unit 6 which requires a selected movement before the diaphragm unit begins to cut-off or modulate the bleed of the fluid from chamber 7. In addition, a relatively light coil spring 69 is mounted within the input chamber 16 in the same manner as the load spring 18 in the embodiment of the invention shown in FIG. 2. In FIG. 9, however, the spring 69 has a substantially small force and does not move the unit 8 to the modulating position. Spring 69 may be adjusted, however, to vary the spacing of the seal portion 23 with respect to the nozzle and orifice unit 6 and the required movement to establish the working position of the unit 8. The load pressure signal is thus normally freely exhausted until the input fluid signal to the chamber 16 rises to a selected level. The spring 69 thus functions to, in essence, provide a variable spacer to permit adjustment of the input signal offset of the output response characteristic.

As previously noted the diaphragm unit 8 of the present invention has a relatively low axial stiffness or diaphragm rate. As a result, the very slight movement of the diaphragm unit 8 associated with the variations of the input or load is such that the effect of the spring stiffness in the axial direction is insignificant. However, for a relative gross movement of the central portion of the diaphragm unit, a selected force is required. The variation of the signal about this selected force is essentially independent of the spring characteristic as a result of the minimal spring rate characteristic and, consequently, the force to move the unit to the working position constitutes a constant which is added to the input signal. Normally, as previously noted, the movement of the diaphragm unit during the modulating control is of the order of ten thousandths of an inch. The movement from a rest position to a working position may be of the order of fifty thousandths of an inch.

The amount of movement in the illustrated embodiment of the invention is dependent upon the combined effect of the spacer and the spring loading. Thus, if the spring is compressed the diaphragm unit 8 will tend to be moved more closely to the working position and, consequently, the input signal must increase to a lesser level before it effectively begins to modulate the output pressure and produces the desired repeater action.

In this aspect of the present invention, the diaphragm unit 8 functions in the same manner as heretofore described but employs the concept that gross movement of the unit 8 may require a selected force to provide an adjustable set point control for the repeater. The spacer may of course be integrally formed with the housing to space the diaphragm unit 8 with respect to the nozzle and orifice unit 6.

FIG. 10 graphically illustrates the effect of the spacer and the spring loading of a repeater as shown in FIG. 9. The input pressure level to the chamber 16 is shown on the horizontal axis and a related output or load pressure is correspondingly shown on the vertical axis. In FIG. 10, a first trace 70 illustrates the characteristic with the spring unloaded such that the diaphragm unit 8 is spaced a maximum distance from the nozzle and orifice means 6. The input pressure must rise to the illustrated level before bleed modulation is initiated as a result of the unit 8 reaching the working position and the output pressure begins to rise, after which the output pressure increases proportionately with the input reference signal from the signalling means 67.

The characteristic can be shifted by the compression of the light spring 69 to reduce the effective input pressure starting point and if desired to establish a positive initial output pressure with a zero input pressure signal, as graphically illustrated by the trace 71. As the spring 69 is compressed the diaphragm unit 8 is moved toward the working position and the input signal need only rise to some proportionate lesser level before repeater action is established. Further, if the spring 69 tends to seal the nozzle and orifice unit 6, the output pressure level will rise to the necessary level and thus establish a corresponding output pressure as the starting point for the repeater action.

For example, with the previously described repeater having an outside diameter of 0.775 inches and 0.004 inch thick flat spring 29, the addition of an 0.050 inch spacer, an initial input pressure of approximately 1 psi was required before the repeater action was established. Compressing of a light load spring resulted in shifting of characteristic and permitting the addition of a constant of 9 psi.

In order to further increase the constant, a thicker spring 29 can be employed. For example, a 0.012 inch thick spring and a 0.012 thick spacer, a 6 psi negative or subtracted constant was obtained. However, the "diaphragm rate" of such a spring was such that some output deviation was encountered with changes in load flow. Consequently, the unit should be employed with a dead-ended output or load.

The adjustable repeater may be applied to various uses such as the maintaining of a constant pressure difference across the interim orifice of a flow controller, setting of the switching point in an adjustable pressure switch and the like.

The present invention thus provides a highly improved bleed type pressure regulating control unit to accurately and reliably minimize variation in output pressure with changes in the operating parameters and permits substantial conservation of fluid when applied to the novel two stage pressure regulating system.

Various modes of carrying out the invention are contemplated as being with the scope of the following claims, particularly pointing out and distinctly claiming the subject matter which is regarded as the invention.

We claim:

1. A bleed pressure control apparatus comprising a chamber means having a chamber and having a fluid pressure input means and a bleed orifice means terminating in said chamber, a diaphragm unit including a diaphragm formed of a resilient material, said diaphragm having a central seal portion aligned with said orifice means and an outer peripheral portion joined by an intermediate convoluted portion, a spring means having a center spring portion aligned with and firmly secured to said central seal portion and an outer peripheral portion connected to said seal portion by a plurality of spring members to establish a low axial stiffness and a high radial stiffness, means to fixedly mount the peripheral portions of said diaphragm and said spring means to said chamber means, and bias means coupled to the backside of said diaphragm unit and operative to urge said diaphragm unit toward said orifice means.

2. The bleed pressure control apparatus of claim 1 wherein said spring means is a single metal member having said center portion integrally connected to said peripheral portion, said spring members including a plurality of similar shaped arms each extending circumferentially and radially between said center portion and said peripheral portion.

3. The bleed pressure control apparatus of claim 1 wherein said bias means is a coil spring coupled to the backside of said central seal portion of said diaphragm unit and inwardly of said spring members.

4. The bleed pressure control apparatus of claim 1 wherein said bias means includes a coil spring aligned with said seal portion.

5. The bleed pressure control apparatus of claim 4 wherein said diaphragm includes an enlargement projecting into said spring, and a spring guide resting on said lug and including a support flange for said spring.

6. The bleed pressure control of claim 1 wherein an adhesive bonds said center spring portion to said central seal portion.

7. The bleed pressure control apparatus of claim 1 having a supply restrictor means connected to said fluid pressure input means.

8. The bleed pressure control apparatus of claim 1 wherein said bias means is a coil spring substantially coaxial with said orifice means, said center spring portion is a continuous solid plate-like member, and a resilient sealing layer is firmly secured to the center spring portion in alignment with said orifice means.

9. The bleed pressure apparatus of claim 8 including a movable backing support for said coil spring, and means for moving said support toward said nozzle and orifice means to adjust the compression of said spring and the fluid pressure in said chamber.

10. A bleed pressure control apparatus of claim 1 wherein said center spring portion is a ring member having an inner periphery spaced radially of said orifice means and exposing said diaphragm seal portion to said orifice means.

11. The bleed pressure control apparatus of claim 10 including stop members aligned with said ring member in spaced relation about said orifice means and terminating below the working face of said orifice means.

12. The bleed pressure control apparatus of claim 1 wherein said chamber means includes a spring housing of a predetermined temperature coefficient of expansion and said housing projecting outwardly of said diaphragm unit, said bias means includes a coil spring within said housing and engaging the backside of said diaphragm unit coaxially of said bleed orifice means, means to adjust the position of the outer end of said coil spring, said central seal portion including an outwardly projecting enlargement extended into said coil spring, said center spring being a plate-like member adhesively bonded to said central seal portion, and said diaphragm having a temperature coefficient of expansion and said seal portion and enlargement being selected to compensate for temperature related movement of said coil spring.

13. The bleed pressure control apparatus of claim 1 wherein said diaphragm unit includes a rest position spaced from the bleed orifice means by a preselected distance to establish an essentially unrestricted exhausting of the input pressure means to said chamber and movable a preselected distance toward said orifice means to a working position before modulating of said fluid pressure input means, said bias means including an input signal pressure chamber and a fluid pressure input signal means for establishing a pressure signal opposing the pressure signal in said chamber, said spacing of said bleed orifice means establishing a preselected constant pressure signal.

14. The bleed pressure control apparatus of claim 13 wherein said bias means includes a relatively light spring means mounted within said chamber and operable to selectively position said diaphragm unit with respect to said orifice means between the rest position and the working position wherein the diaphragm unit effectively modulates the flow from said load chamber through said bleed orifice means.

15. The bleed pressure control apparatus of claim 14 including an adjustable means for variably compressing said light spring means to adjust said constant pressure signal.

16. The bleed pressure control apparatus of claim 14 including an adjustable means for variably compressing said light spring means and positioning said diaphragm unit from said rest position to a sealing position in engagement with said orifice means.

17. A diaphragm unit for pressure regulating means comprising a diaphragm having a central seal portion and an outer mounting portion joined by a convolute portion to establish a low stiffness in movement of said central seal portion relative to said mounting portion in a direction normal to said seal and mounting portions, and an essentially flat spring having a center spring portion and an outer mounting portion connected by a plurality of circumferentially spaced spring members, and attachment means affixing said center spring portion to said central seal portion to provide radial rigidity to said diaphragm and to maintain low stiffness of the central seal portion in said normal direction.

18. The diaphragm unit of claim 17 wherein said diaphragm is a molded rubber-like member with coplanar seal and outer mounting portions and said convolute portion is a single convolution.

19. The diaphragm unit of claim 17 wherein said spring is a single metal member having coplanar center spring and outer mounting portions, said spring members being coplanar with said center spring and mounting portions and extending circumferentially of said portions.

20. The diaphragm unit of claim 17 wherein said diaphragm includes an integral enlargement extending from said central seal portion opposite said center spring portion.

21. The diaphragm unit of claim 17 wherein said attachment means is an adhesive covering the attached surfaces of said center spring portion and said central seal portion.

22. The diaphragm unit of claim 17 wherein said central seal portion includes a planar seal surface, said center spring portion is a planar plate member, said attachment means is an interfacing adhesive between said center spring portion and said central seal portion, and a thin seal layer is secured to the opposite face of said plate member, said layer being formed of a resilient material.

23. The diaphragm unit of claim 17 wherein said center spring portion is a ring member exposing the center of said central seal portion of said diaphragm.

24. The diaphragm unit of claim 17 wherein said diaphragm is a single piece molded member having the surfaces of said central seal portion and said outer mounting portion coplanar with said convolute portion being a single convolute extending outwardly from said coplanar surfaces, said flat spring is a single piece metal spring having said spring members extending circumferentially of said spring and mounting portions, and said attachment means being an adhesive interposed between said center spring portion and said central seal portion coextensively of said spring portion.

25. The diaphragm unit of claim 24 having a central frusto conical lug extending outwardly of said seal portion in inwardly spaced relation to said convolute portion and having an outer planar surface.

26. The diaphragm unit of claim 24 wherein said center spring portion is a continuous ring exposing the center of said diaphragm.

27. The diaphragm unit of claim 24 wherein said center spring portion is a continuous plate coextensive with said central seal portion and a thin layer of a resilient sealing material covers the outer surface of said plate.

28. A bleed pressure regulating apparatus for supplying a varying fluid flow to a load, comprising a first stage pressure regulator including a control chamber having a fluid input restrictor and having a bleed orifice means for exhausting said chamber, said pressure regulator including a diaphragm unit defining a wall of the control chamber and a compression spring urging said diaphragm unit toward said bleed orifice means to adjust the fluid pressure in said chamber, a fluid repeater including a diaphragm unit forming a common wall between an input reference pressure and an output load chamber, conduit means connected to said input reference pressure chamber and to said control chamber, a supply restrictor connected to said load chamber, and a variable flow load connected to said load chamber.

29. The bleed pressure regulating apparatus of claim 28 having a second variable load spaced from said first load and from said pressure regulator, a second fluid repeater correspondingly connected between said second load and said pressure regulator, and said repeaters being mounted closely adjacent the corresponding loads and connected by said conduit means to said common pressure regulator.

30. The bleed pressure regulating apparatus of claim 28 wherein each of said diaphragm units includes a diaphragm having a central seal portion and an outer mounting portion connected by a convolute portion and a flat spring having a central portion firmly affixed to said seal portion and an outer mounting portion connected to said center portion by circumferentially spaced spring members.

31. The bleed pressure regulating apparatus of claim 28 wherein each of said diaphragm units includes a central seal portion and an outer mounting ring joined by a convolute portion to establish a low stiffness in movement of said central seal portion relative to said mounting portion in a direction normal to said seal and mounting portions, and an essentially flat spring having a center spring portion and an outer mounting portion connected by a plurality of circumferentially spaced spring members, and means affixing said center spring portion to said central seal portion to provide radial rigidity to said diaphragm and to maintain low stiffness of the central seal portion in said normal direction.

32. The bleed pressure regulating apparatus of claim 31 wherein the central seal portion of said pressure regulator includes an enlargement defining a planar back wall, a spring guide disposed upon said enlargement and having a radial planar flange, a coil spring compressed upon said flange to establish the output pressure to said fluid repeater.

33. The bleed pressure regulating apparatus of claim 28 wherein said diaphragm unit of said fluid repeater includes a rest position spaced from the bleed orifice means permitting essentially unrestricted exhaust flow from the load chamber through said orifice means and movable a preselected distance to a working position modulating said exhaust flow, said diaphragm unit moving to the working position in response to a corresponding input signal in said load chamber and reference pressure chamber and thereafter modulating the output pressure in accordance with and corresponding to the variation of the input pressure signal from said control chamber of said pressure regulator.

34. The bleed pressure regulating apparatus of claim 33 wherein said fluid repeater includes a light coil spring positioning said diaphragm unit with respect to the working position and thereby varying the response to the input pressure signal.

35. A bleed pressure fluid repeater comprising a chamber means having a load chamber and having a fluid pressure input means and a bleed orifice means terminating in said chamber, a diaphragm unit including a diaphragm formed of a resilient material, said diaphragm having a central seal portion aligned with said orifice means and an outer peripheral portion joined by an intermediate convoluted portion, a flat spring having a center spring portion aligned with and firmly secured to said central seal portion and an outer peripheral portion connected to said seal portion by a plurality of spring members to establish a selected axial stiffness and a high radial stiffness, means to fixedly mount the peripheral portions of said diaphragm and said spring means to said chamber means with said seal portion spaced from said orifice means to permit unrestricted flow through said orifice means, an input chamber coupled to the backside of said diaphragm unit and having an input pressure signal means to urge said diaphragm unit toward said orifice means, and a bias coil spring in said input chamber holding said seal portion in sealing engagement with said orifice means with a selected minimum pressure in said load chamber, said selected axial stiffness of said spring being selected to establish said selected minimum pressure.

36. The bleed pressure fluid repeater of claim 35 having means to variably compress said coil spring to vary the force of said coil spring and permit movement of said seal portion from said orifice means.

* * * * *